US012812353B2

(12) United States Patent
Cakulev et al.

(10) Patent No.: US 12,812,353 B2
(45) Date of Patent: Nov. 24, 2026

(54) HOME NETWORK FUNCTION SELECTION FOR MOBILE NETWORK HOME-ROUTED ROAMING

(71) Applicant: Verizon Patent and Licensing Inc., Basking Ridge, NJ (US)

(72) Inventors: Violeta Cakulev, Millburn, NJ (US); Lixia Yan, Basking Ridge, NJ (US); Helen Osias Eglip, Sammamish, WA (US); Jerry Steben, Fort Worth, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 237 days.

(21) Appl. No.: 18/889,788

(22) Filed: Sep. 19, 2024

(65) Prior Publication Data

US 2026/0082201 A1 Mar. 19, 2026

(51) Int. Cl.

| | |
|---|---|
| ***H04W 8/06*** | (2009.01) |
| *H04W 8/02* | (2009.01) |
| *H04W 84/04* | (2009.01) |

(52) U.S. Cl.
CPC ............ *H04W 8/06* (2013.01); *H04W 84/042* (2013.01)

(58) Field of Classification Search
CPC ........... H04W 8/06; H04W 8/04; H04W 8/02; H04W 84/042
See application file for complete search history.

(56) References Cited

U.S. PATENT DOCUMENTS

| | | | | |
|---|---|---|---|---|
| 2024/0080651 A1* | 3/2024 | Keller | ..................... | H04W 8/06 |
| 2025/0088837 A1* | 3/2025 | Chikatmarla | ........... | H04W 8/06 |

FOREIGN PATENT DOCUMENTS

| | | | | |
|---|---|---|---|---|
| EP | 3737127 A1 * | 11/2020 | ............. | H04W 8/12 |

* cited by examiner

*Primary Examiner* — Jinsong Hu
*Assistant Examiner* — Farideh Madani

(57) ABSTRACT

A mobility management function residing in a visited Public Land Mobile Network (vPLMN) receives, from a Network Repository Function (NRF) residing in a home Public Land Mobile Network (hPLMN), a network address and/or a fully qualified domain name (FQDN) of a home network function (hNF) residing in the hPLMN. The mobility management function creates a network service request, associated with a User Equipment device (UE) that is roaming in the vPLMN, where the network service request comprises the network address and/or the FQDN. The mobility management function sends the network service request to a visited network function (vNF) residing in the vPLMN, and receives, via the vNF, results of execution of a network service by the hNF, and uses the results for handling the roaming UE's traffic in the vPLMN.

20 Claims, 10 Drawing Sheets

HOME NETWORK FUNCTION SELECTION FOR MOBILE NETWORK HOME-ROUTED ROAMING

BACKGROUND

Mobile network operators form roaming partnerships to provide uninterrupted service to their subscribers in geographic locations that are outside of their network's coverage area. Network boundaries are defined by designated Public Land Mobile Networks (PLMNs), with each PLMN being operated by a particular mobile network operator. When a user equipment device (UE) roams from its home PLMN (hPLMN) into a coverage area of another PLMN operated by another network operator, called a visited PLMN (vPLMN), the vPLMN, in accordance with its roaming partnership with the hPLMN, provides network access and packet routing for the UE while the UE is outside of its hPLMN.

DETAILED DESCRIPTION

Figure 1:
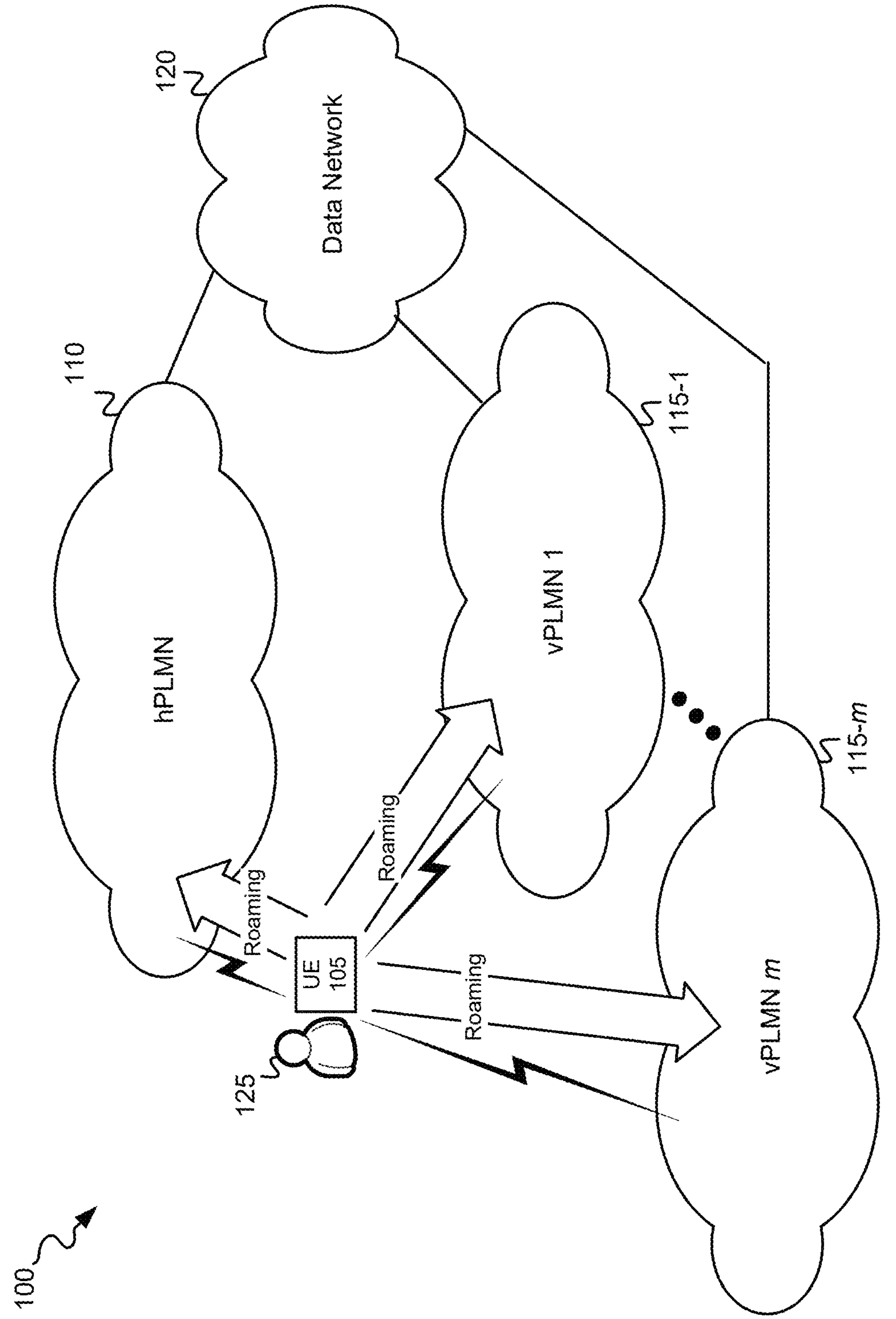
FIG. 1 depicts an example network environment in which procedures for selecting a home Network Function (hNF) for Home Routed roaming may be implemented.

The following detailed description refers to the accompanying drawings. The same reference numbers in different drawings may identify the same or similar elements. The following detailed description does not limit the invention.

A vPLMN, to implement packet routing for a UE roaming outside of the UE's hPLMN, may include a Home Routed (HR) architecture and/or a Local Breakout (LBO) architecture. When using the HR architecture, the vPLMN routes a roaming UE's data plane traffic to the UE's hPLMN, and the hPLMN then processes and forwards the data traffic to its destination. Using the HR architecture enables the hPLMN to control and monitor data traffic from its roaming subscribers that are temporarily located in vPLMN coverage areas of other mobile network operators. When using an LBO architecture, the vPLMN grants UEs direct access to external networks (e.g., edge networks with Multi-Access Edge Computing (MEC)) through its local User Plane function and bypasses routing through the hPLMN. Using LBO significantly reduces data traffic latency as it eliminates the extra round-trip time required for routing data through the hPLMN. Use of LBO in the vPLMN, however, raises concerns about reliability from the hPLMN's perspective since the hPLMN loses visibility into, and control over, the data plane for evaluating and accounting the subscriber's usage in the visited network. Therefore, use of HR architecture is currently the predominant roaming approach in Long-Term Evolution (LTE) and Next Generation mobile networks (e.g., Fifth Generation (5G) networks).

In the HR architecture, to ensure a proper selection of a hNF (e.g., home Policy Control Function (hPCF) or home Session Management Function (hSMF) selection) for a roaming UE whose user/subscriber subscribes to a particular hPLMN, the Access and Mobility Management Function in the vPLMN (i.e., visited AMF (vAMF)) selects the hNF and then shares the selected hNF with the corresponding visited NF (vNF) in the vPLMN to ensure that the vNF selects that hNF for home routing of a UEs traffic. When using existing procedures in an HR architecture during, for example, UE policy association establishment, the AMF in the vPLMN in which the UE is visiting engages in a discovery process with a Network Repository Function (NRF) in the hPLMN (i.e., hNRF) to obtain an identifier of the hPCF (hPCF ID). The AMF sends the hPCF ID to a corresponding vPCF in the vPLMN, and the vPCF also engages in a discovery process with the hNRF to obtain a network address and/or fully qualified domain name (FQDN) of the hPCF. Subsequent to this two-step procedure, the vPCF sends a UE Policy Association Request to the hPCF using the obtained hPCF ID and network address and/or FQDN of the hPCF. The hPCF, in response to the Request, returns UE policy information to the vPCF which, in turn, sends the UE policy information to the AMF in the vPLMN. This two-step procedure has a number of limitations, including the following: 1) the AMF always needs to select the hNF, 2) the AMF can only share a single hNF with a vNF, and 3) in the case of UE policy association, the AMF can only share the hPCF ID of the home PCF. These limitations result in potential redundancies that increase latency and transactions per second (TPS) and increase complexity in the mobile network.

The procedures for selecting a hNF for HR UE roaming, as described herein, provide enhancements/modifications to hNF discovery such that there is flexibility with respect to what NF can perform the hNF discovery and what information can be shared between NFs doing the discovery and the NFs using the discovery result. A first enhancement/modification of procedures for selecting a hNF for HR UE roaming allows, as described with respect to FIGS. 5 and 6 below, vNFs to perform hNF discovery, instead of the AMF. A further enhancement/modification of procedures for selecting a hPCF for HR UE roaming allows, as described with respect to FIGS. 7 and 8 below, the AMF to share the hPCF's network address and/or FQDN with the vPCF. Another enhancement/modification of procedures for selecting a hNF for HR UE roaming allows, as described with respect to FIGS. 9 and 10 below, the AMF to share multiple hNFs in a hPLMN with a vNF. Implementation of these enhancements/modifications in the procedures for selecting a hNF or hPCF during HR UE roaming reduces latency and TPS by enabling: 1) the vNF to perform hNF discovery to avoid redundant hNF discoveries, 2) the AMF to share multiple hNFs with the vNF, and 3) the AMF to share the network address and/or FQDN of the hPCF with the vPCF.

FIG. 1 depicts an example network environment 100 in which procedures for selecting a hNF for HR roaming, as described in further detail herein, may be implemented. As shown, network environment 100 includes a UE 105, a hPLMN 110, vPLMNs 115-1 through 115-*m*, and a data network 120. UE 105 (referred to herein as "UE 105") may include any type of electronic device having a wireless communication capability. Though only a single UE 105 is shown for simplicity, network environment 100 may include numerous UEs (e.g., z>>1). UE 105 may include, for example, a laptop, palmtop, desktop, or tablet computer; a cellular phone (e.g., a "smart" phone); a Voice over Internet Protocol (VOIP) phone; a smart television (TV); an audio speaker (e.g., a "smart" speaker); a video gaming device; a music player (e.g., a digital audio player); a digital camera; a device in a vehicle; a drone; a wireless telematics device; an Augmented Reality/Virtual Reality (AR/VR) headset or glasses; or an Internet of Things (IOT) or Machine-to-Machine (M2M) device. A user (also referred to herein as a "subscriber") may carry, use, administer, and/or operate UE 105. For example, as shown, a user 125 may operate UE 105.

hPLMN (referred to herein as "hPLMN 110," "home mobile network," or "mobile network") and vPLMNs 115-1 through 115-*m* (referred to herein as "vPLMN 115," "visited mobile network," or "mobile network") may each include any type of a PLMN. In some implementations, hPLMN 110 and each vPLMN 115 may include any type of a Next Generation mobile network that may further include evolved network components (e.g., future generation components) relative to a Long Term Evolution (LTE) network, such as a 4G or 4.5G mobile network. For example, hPLMN 110 or vPLMN 115 may each include a 5G mobile network, a 5G Advanced mobile network, or a Sixth Generation (6G) mobile network. Furthermore, hPLMN 110 and vPLMN 115 may each include an LTE network (e.g., 4G or 4.5G network) or a hybrid Next Generation/4G network that includes certain components of both a Next Generation network (e.g., a 5G network) and a 4G network. Therefore, each hPLMN 110 and vPLMN 115 may include one of an LTE network, a Next Generation mobile network (e.g., 5G or 6G network), or any other type of a PLMN.

The subscriber 125 that carries, uses, administers, and/or operates UE 105 may subscribe to mobile network service with hPLMN 110 such that UE 105 may seamlessly obtain a wireless connection with the hPLMN 110 to send/receive voice and/or data traffic. For example, referring to FIG. 1, subscriber 125 may have a mobile network service subscription for UE 105 with hPLMN 110.

Subscriber 125 may cause UE 105 to roam outside of the geographic coverage area of the hPLMN 110 to which the subscriber 125 has subscribed. For example, UE 105 may roam outside the coverage area of hPLMN 110 and into the coverage areas of a vPLMN 115. As shown in FIG. 1, UE 105 may roam from hPLMN 110 into vPLMN 1 115-1, or from hPLMN 110 into vPLMN 115-*m*. When UE 105 has roamed into one of the vPLMNs 115, HR-routing of UE 105's traffic may occur as described further below.

As shown in FIG. 1, hPLMN 110 and each vPLMN 115 connects with data network 120. Data network 120 may include one or more interconnected networks, such as local area networks (LANs), wide area networks (WANs), metropolitan area networks (MANs), Public Switched Telephone Networks (PSTNs), Multi-Access Edge Computing networks (MECs), and/or the Internet. Data network 120 may connect with particular Network Functions (NFs) of hPLMN 110 and each vPLMN 115 (e.g., a UPF(s) (not shown) of hPLMN 110 or vPLMN 115, when those networks are 5G mobile networks).

Figure 2:
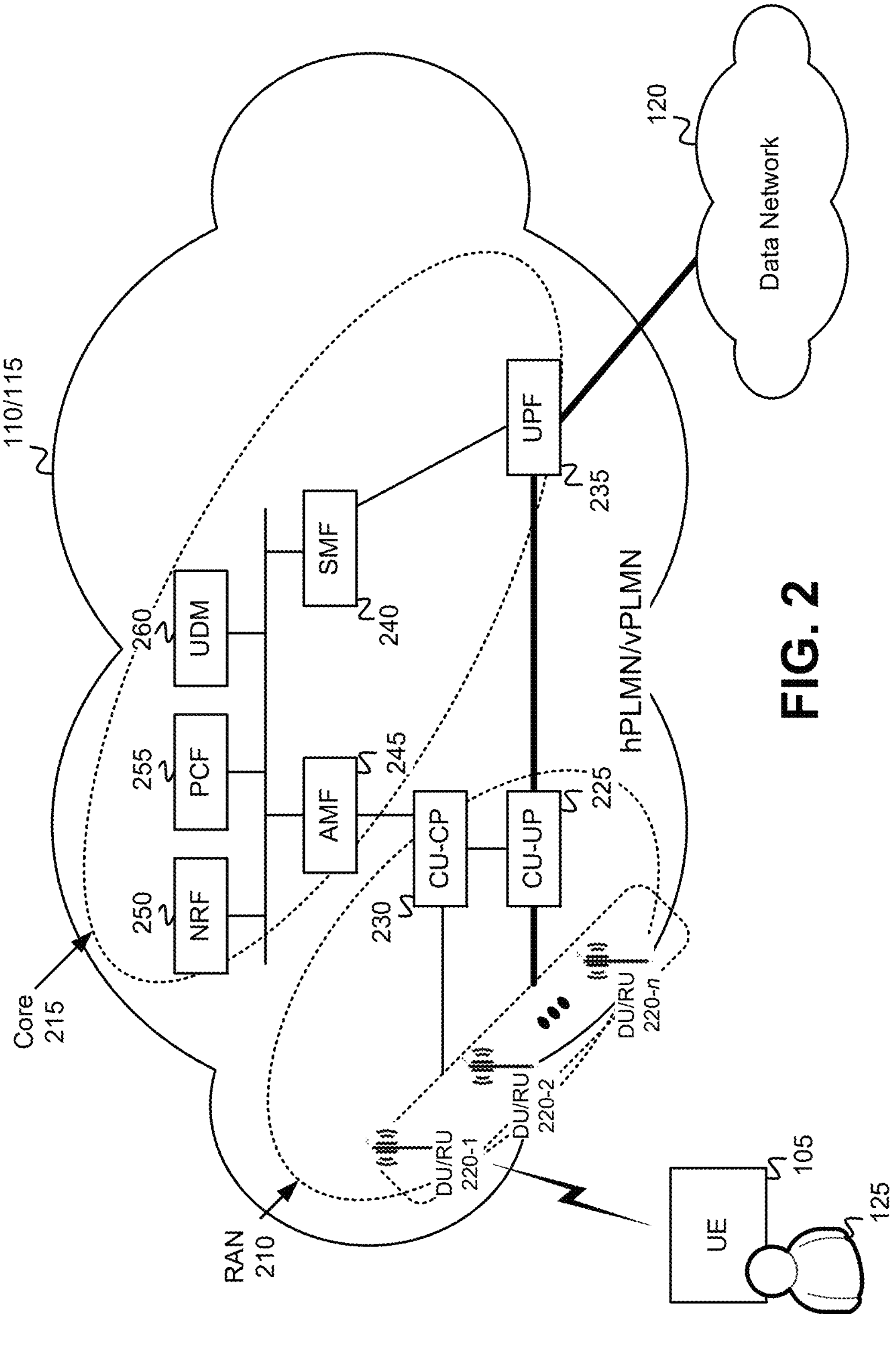
FIG. 2 illustrates example components of a hPLMN or a vPLMN that enable provision of a mobile network service.

FIG. 2 illustrates an example of UE 105 obtaining mobile network service from either a hPLMN 110 or a vPLMN 115, and example components of hPLMN 110 or vPLMN 115 that enable provision of the mobile network service. As shown, hPLMN/vPLMN 110/115 may include sub-networks, such as a Radio Access Network (RAN) 210 and a mobile core network 215. RAN 210 may include various types of radio access equipment that enable RF communication with UE 105. The radio access equipment of RAN 210 may include, for example, multiple Distributed Units and Radio Units (DUs/RUs 220-1 through 220-*n*), at least one Control Unit-User Plane function (CU-UP) 225, and at least one Control Unit-Control Plane (CU-CP) function 230. Additionally, or alternatively, RAN 210 may include non-split or integrated RAN devices, such as a Next Generation NodeB (gNB) or Evolved NodeB (eNB). Only a single one of CU-UP 225 and CU-CP 230 is shown in FIG. 2, however, RAN 210 may include multiple CU-CPs 230 and CU-UPs 225. CU-UP 225, among other functions, routes outgoing traffic (e.g., from UE 105, to a DU/RU 220, and to CU-UP 225) to a UPF 145 and routes incoming traffic (from UPF 235) to a DU/RU 220 that serves the traffic's destination UE 105.

Each DU of a DU/RU 220 includes a logical node that hosts functions associated with the Radio Link Control (RLC) layer, the Medium Access Control (MAC) layer, and the physical layer (PHY). Each DU further performs centralized processing and coordination of one or more RUs, handles tasks such as scheduling and overall control of the radio resources, and interfaces with core network functions (NFs) to establish and manage connections with UEs 105 and to facilitate communication between different cells.

The RUs of a DU/RU 220 may be located at certain geographic positions within hPLMN/vPLMN 110/115, and operate as radio function units that transmit and receive RF signals to/from UEs 105. Each of the RUs may include at least one antenna array, transceiver circuitry, and other hardware and software components for enabling the RUs to receive data via wireless RF signals from UEs 105, and to transmit wireless RF signals to UEs 105. Each RU may connect to a respective DU.

CU-UP 225 may interconnect with one or more DUs of RAN 210 via fronthaul links or a fronthaul network, and may include a logical node that hosts user plane functions, such as, for example, data routing and transport functions. CU-CP 230 includes a logical node that hosts Radio Resource Control (RRC), and other control plane, functions (e.g., Service Data Adaptation Protocol (SDAP), Packet Data Convergence Protocol (PDCP)) for the CU-UP 225 and for the DUs/RUs 220 that it controls. RAN 210 may additionally include other nodes, functions, and/or components not shown in FIG. 2.

Core network 215 includes devices or nodes that host and execute NFs that operate in hPLMN/vPLMN 110/115 including, among other NFs, mobile network access management, session management, and policy control NFs. In the example of FIG. 2, core network 215 is shown as including 5G NFs, such as a User Plane Function (UPF) 235, a Session Management Function (SMF) 240, an Access and Mobility Management Function (AMF) 245, a Network Repository Function (NRF) 250, a Policy Control Function (PCF) 255, and a Unified Data Management (UDM) function 260. Each of UPF 235, SMF 240, AMF 245, NRF 250, PCF 255, and UDM 260 may be implemented as a Virtual Network Function (VNF) or a Cloud-Native Network Function (CNF) (e.g., at a data center(s)) or as a Physical Network Function (PNF) within hPLMN/vPLMN 110/115.

UPF 235 may act as a router and a gateway between hPLMN/vPLMN 110/115 and data network 120, and forwards session data between data network 120 and RAN 210. Though only a single UPF 235 is shown in FIG. 2, hPLMN/vPLMN 110/115 may include multiple UPFs 235 at various locations within hPLMN/vPLMN 110/115. SMF 240 performs session management and selects and controls UPFs 235 for data transfer. AMF 245 performs mobility management for the UEs 105.

NRF 250 operates as a centralized repository of information regarding NFs in hPLMN/vPLMN 110/115. NRF 250 enables NFs (e.g., UPF 235, SMF 240, AMF 245, PCF 255, UDM 260) to register and discover each other via an Application Programming interface (API). NRF 250 maintains an updated repository of information about the NFs available in hPLMN/vPLMN 110/115, along with information about the services provided by each of the NFs. NRF 250 further enables the NFs to obtain updated status information of other NFs in hPLMN/vPLMN 110/115. NRF 250 may, for example, maintain profiles of available NF instances and their supported services, allow NF instances to discover other NF instances in hPLMN/vPLMN 110/115, and allow NF instances to track the status of other NF instances.

PCF 255 may provide policy rules for control plane functions (e.g., for network slicing, roaming, and/or mobility management) and may access user subscription information for policy decisions. UDM 260 manages data for user access authorization, user registration, and data network profiles. UDM 260 may include, or operate in conjunction with, a User Data Repository (UDR—not shown) which stores user data, such as customer/subscriber profile information, customer/subscriber authentication information, user-subscribed network slice information, and encryption keys.

The configuration of components of the hPLMN/vPLMN 110/115 shown in FIG. 2 is for illustrative purposes. Other configurations may be implemented. Therefore, hPLMN/vPLMN 110/115 may include additional, fewer, and/or different components that may be configured in a different arrangement than that depicted in FIG. 2. For example, core network 215 may include other NFs not shown in FIG. 2. Additionally, though only a single instance of each of the NFs (e.g., UPF 235, SMF 240, AMF 245, NRF 250, PCF 255, UDM 260) is shown in FIG. 2, hPLMN/vPLMN 110/115 may include multiple instances of each of the NFs. When implemented as VNFs or CNFs, each of the NFs described above may be installed in, and executed by, a network device residing in hPLMN/vPLMN 110/115, or in another network (e.g., in an edge or a far edge network, not shown). A single network device may host and execute one or more of the NFs described above, and hPLMN/vPLMN 110/115 may include at least one network device, or may have multiple (e.g., numerous) network devices that each host and execute one or more of the NFs described above.

Figure 3:
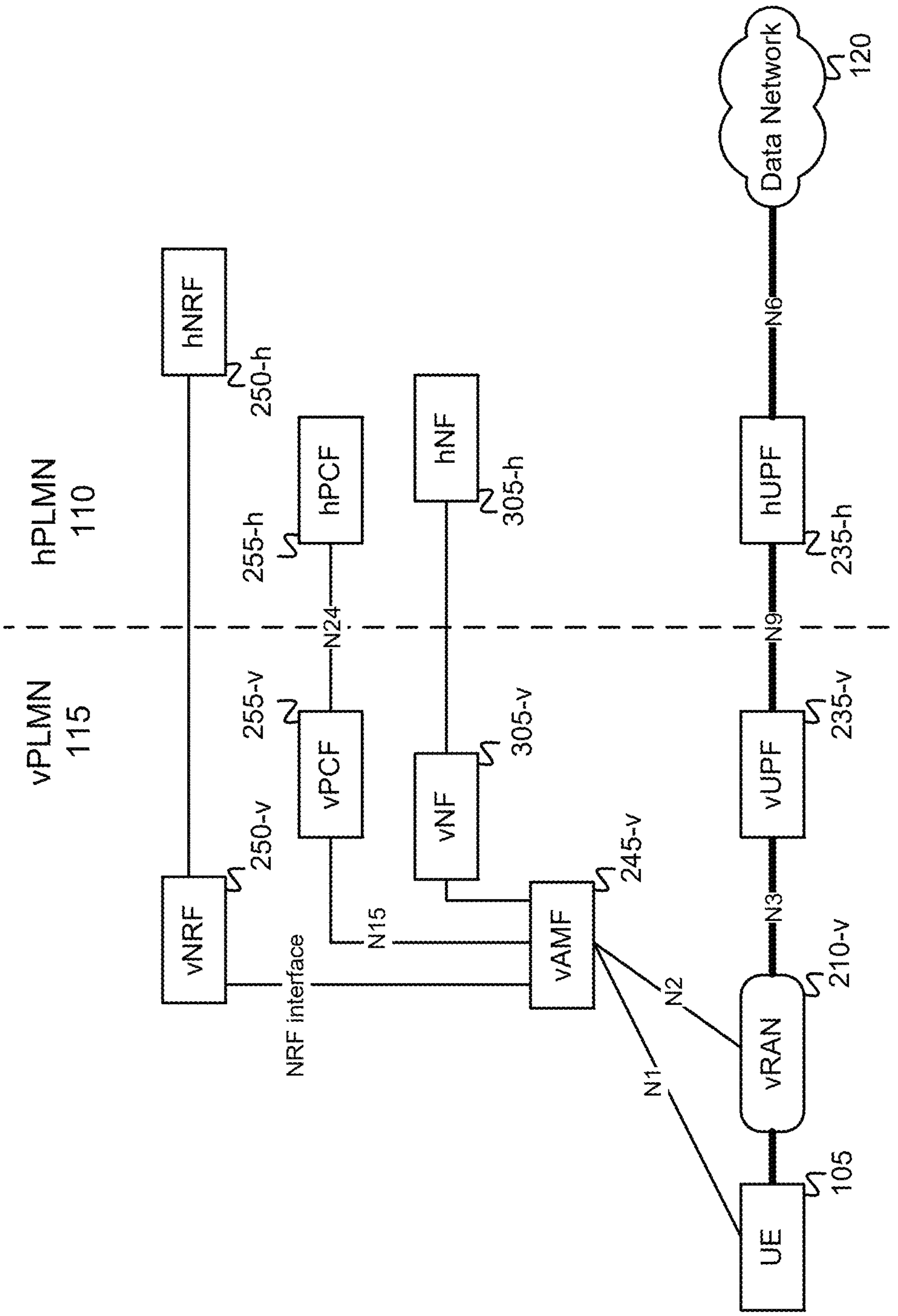
FIG. 3 depicts an example of interconnections between components of a vPLMN and a hPLMN for purposes of implementing Home Routed traffic, associated with a UE, between the vPLMN and the hPLMN.

FIG. 3 depicts an example of interconnections between components of a vPLMN 115 and a hPLMN 110 for purposes of implementing HR traffic, associated with UE 105, between vPLMN 115 and hPLMN 110. In this example, UE 105, which has a network service subscription with hPLMN 110, has roamed out of the coverage area of hPLMN 110 and into the coverage area of vPLMN 115.

As shown, a visited AMF (vAMF) **245-*v* in vPLMN 115 may use a respective NRF interface for sending/receiving messages to/from a visited NRF (vNRF) 250-*v*, and to/from a home NRF (hNRF) 250-h via the vNRF 250-*v*, which may act as an intermediary between vAMF 245-*v* and hNRF 250-*h*. The messages may be associated with NF discovery, such as, for example, discovering the NF IDs, network addresses, and/or fully qualified domain names (FQDNs) of particular NFs within vPLMN 115 or hPLMN 110**.

As further shown, vAMF **245-*v* may use interfaces for sending/receiving messages to/from a visited PCF (vPCF) 255-*v* or a visited NF (vNF) 305-*v* in vPLMN 115. vNF 305-*v* may include any one of the various different NFs within vPLMN 115 (e.g., SMF 240, NRF 250, UDM 260). The messages sent from vAMF 245-*v* may include Request messages (e.g., UE Policy Association Create Request) that vAMF 245-*v* sends to vPCF 255-*v* or vNF 305-*v*** for requesting execution of particular network services.

vPCF **255-*v* may use an interface (e.g., N24 interface) for sending/receiving messages to/from a home PCF (hPCF) 255-h in hPLMN 110. The messages between vPCF 255-*v* and hPCF 255-*h* may relate to, for example, the transfer of UE policy rules from hPCF 255-*h* in the UE 105's hPLMN 110 to the vPCF 255-*v* and vAMF 245-*v* in the vPLMN 115**.

Additionally, vNF **305-*v* may use an interface for sending/receiving messages to/from one or more home NFs (hNFs) 305-h in hPLMN 110. The messages may include Requests for a particular service(s) provided by the one or more hNFs 305-*h*, and Responses to those requests returned to vNF 305-*v* such that vNF 305-*v* can perform services/operations for the roaming UE 105 within vPLMN 115. Though FIG. 3 illustrates only a single hNF 305-*h*, multiple (y) hNFs may possibly be involved with a network service requested by a vNF in vPLMN 115, as described further below with respect to the example process of FIG. 9**.

In the user plane shown in FIG. 3 (identified with darker lines), visited RAN (vRAN) 210-v interconnects with visited UPF (vUPF) **235-*v* via the N3 interface, and vUPF 235-*v* in vPLMN 115 interconnects with home UPF (hUPF) 235-h in hPLMN 110 via the N9 interface. hUPF 235-*h* further interconnects with data network 120 via the N6 interface. User plane data traffic to/from UE 105 may, therefore, be routed between UE 105 and data network 120 across vRAN 210-*v*, vUPF 235-*v*, and hUPF 235-*h*. As further shown, UE 105 connects with vAMF 245-*v* via, for example, the N1 interface and vRAN 210-*v* interconnects with vAMF 245-*v*** via, for example, the N2 interface.

Figure 4:
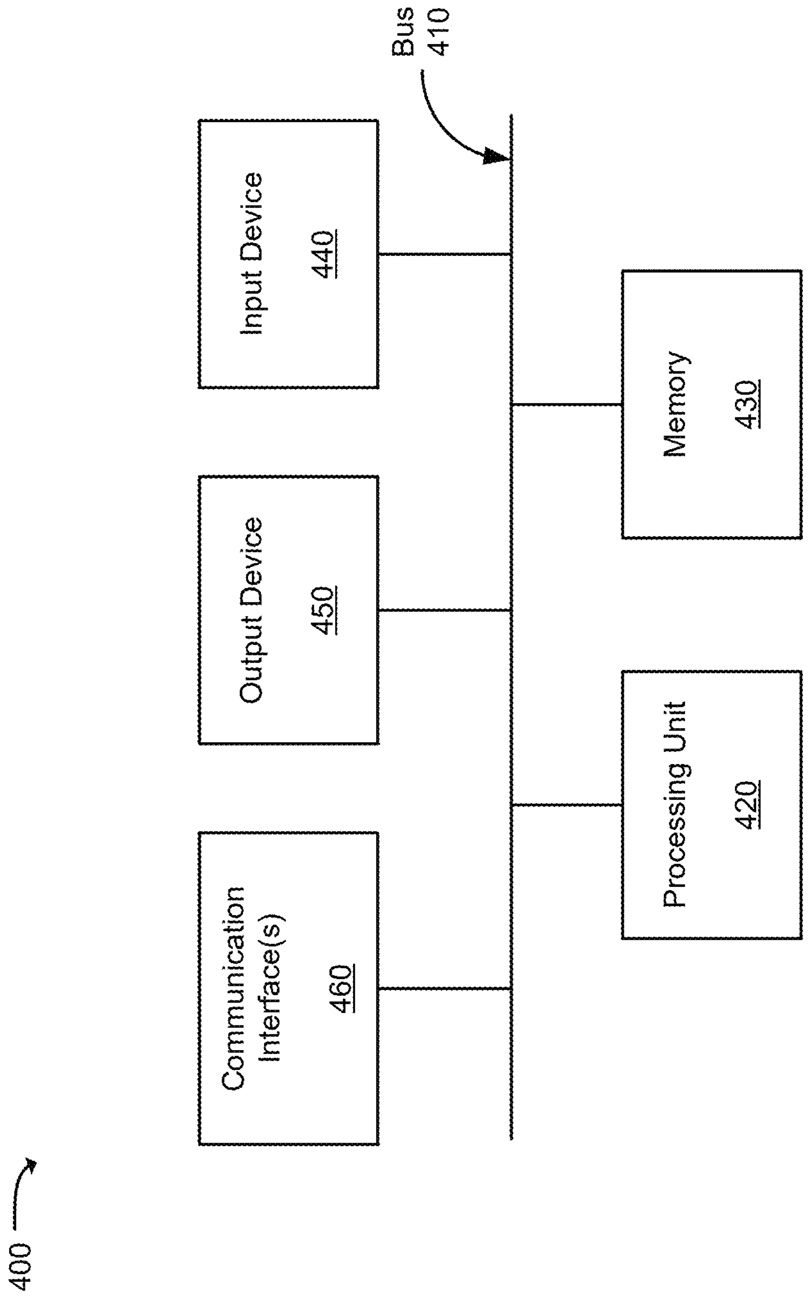
FIG. 4 is a diagram that depicts example components of a network device.

FIG. 4 is a diagram that depicts example components of a network device 400 (referred to herein as a "network device" or a "device"). UE 105, the DUs and/or RUs of DUs/RUs 220, CU-UP 225, and CU-CP 230 may each include components that are the same as, or similar to, those of device 400 shown in FIG. 4. Furthermore, each of the NFs in hPLMN/vPLMN 110/115 (e.g., NFs 305, UPF 235, SMF 240 AMF 245, NRF 250, PCF 255, and/or UDM 260) may be implemented by a device that includes components that are the same as, or similar to, those of network device 400. Some of the NFs of hPLMN/vPLMN 110/115 may be implemented by a same device 400 within hPLMN/vPLMN 110/115, while others of the NFs may be implemented by one or more separate devices 400 within hPLMN/vPLMN 110/115.

Device 400 may include a bus 410, a processing unit 420, a memory 430, an input device 440, an output device 450, and a communication interface 460. Bus 410 may include a path that permits communication among the components of device 400. Processing unit 420 may include one or more processors or microprocessors which may interpret and execute instructions, or processing logic. Memory 430 may include one or more memory devices for storing data and instructions. Memory 430 may include a random access memory (RAM) or another type of dynamic storage device that may store information and instructions for execution by processing unit 420, a Read Only Memory (ROM) device or another type of static storage device that may store static information and instructions for use by processing unit 420, and/or a magnetic, optical, or flash memory recording and storage medium. The memory devices of memory 430 may each be referred to herein as a "tangible non-transitory computer-readable medium," "non-transitory computer-readable medium," or "non-transitory storage medium." In some implementations, the processes/methods set forth herein can be implemented as instructions that are stored in memory (ies) 430 for execution by processing unit(s) 420 of one or more network devices 400.

Input device 440 may include one or more mechanisms that permit an operator to input information into device 400, such as, for example, a keypad or a keyboard, a display with a touch sensitive panel, voice recognition and/or biometric mechanisms, etc. Output device 450 may include one or more mechanisms that output information to the operator, including a display, a speaker, etc. Input device 440 and output device 450 may, in some implementations, be implemented as a user interface (UI) that displays UI information and which receives user input via the UI. Communication interface 460 may include a transceiver(s) that enables device 400 to communicate with other devices and/or systems. For example, communication interface 460 may include one or more wired and/or wireless transceivers for communicating via hPLMN/vPLMN 110/115 and/or data network 120. In the case of RUs of DUs/RUs 220, communication interface 460 may further include one or more antenna arrays for producing radio frequency (RF) cells or cell sectors.

The configuration of components of network device 400 illustrated in FIG. 4 is for illustrative purposes. Other configurations may be implemented. Therefore, network device 400 may include additional, fewer and/or different components, that may be arranged in a different configuration, than depicted in FIG. 4.

Figure 5:
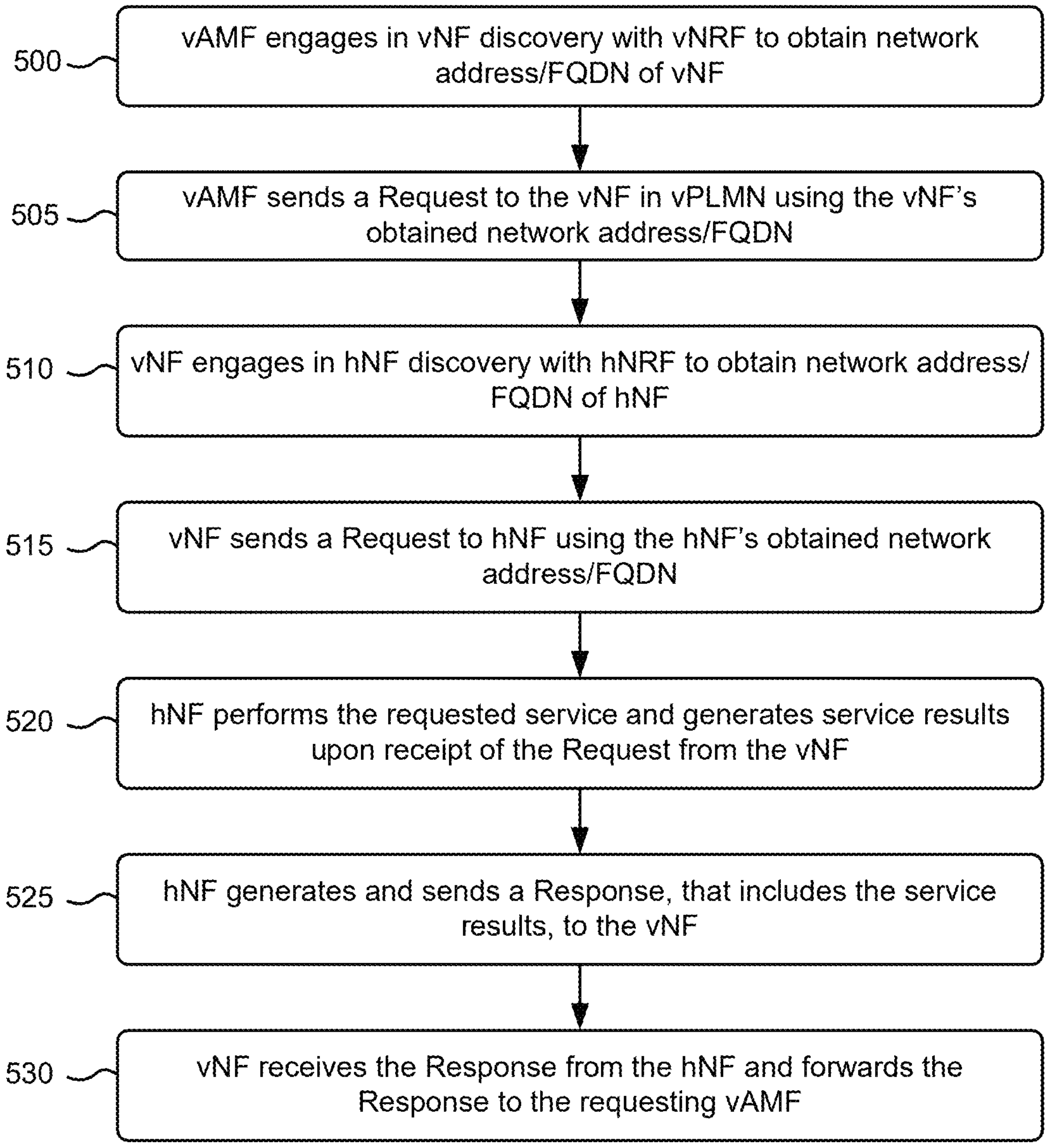
FIG. 5 is a flow diagram of an example process for home network function discovery by another network function in a PLMN visited by a UE in which the Visited Network Function (vNF) engages in hNF discovery with a Network Repository Function in the UE's home PLMN.

FIG. 5 is a flow diagram of an example process for home NF discovery by a NF in a PLMN visited by a UE 105 in which the visited NF, and not the vAMF, engages in hNF discovery with the NRF in the UE 105's home PLMN. The example process of FIG. 5 may be implemented by a vAMF 245-*v* in conjunction with a vNRF 250-*v* and vNF 305-*v* in a vPLMN 115, and a hNRF 250-*h* and hNF 305-*h* in a hPLMN 110. The process of FIG. 5 is described with additional reference to the example diagram of FIG. 6. The example process of FIG. 5 may be executed subsequent to a UE 105 roaming from a coverage area of a hPLMN 110 to a coverage area of a vPLMN 115.

Figure 6:
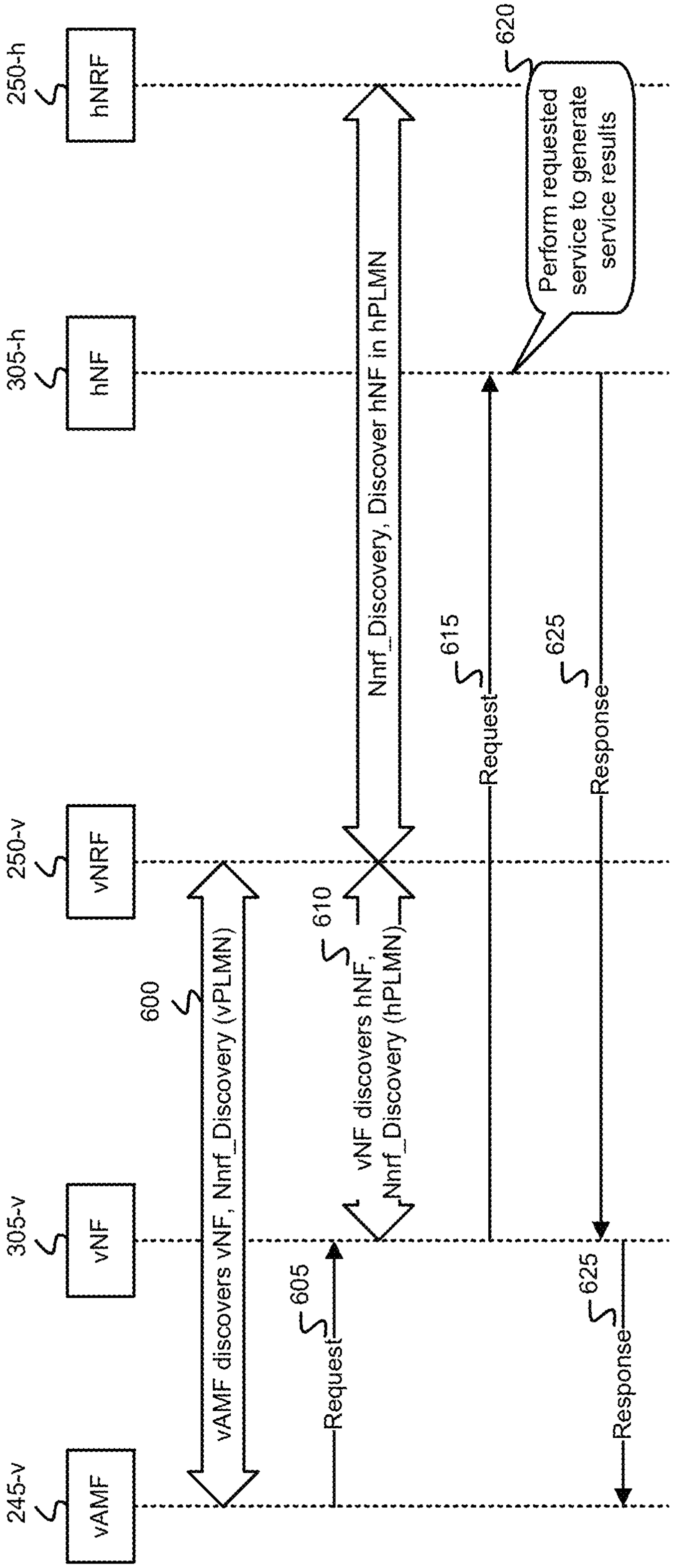
FIG. 6 is an example diagram associated with the process of FIG. 5.

Referring to FIG. 5, the example process includes vAMF 245-*v* engaging in vNF discovery with vNRF 250-*v* to obtain a network address and/or FQDN of a vNF 305-*v* (block 500), and sending a Request to the vNF 305-*v* in the vPLMN 115 using the vNF 305-*v*'s obtained network address/FQDN (block 505). The vAMF 245-*v* engages in vNF discovery to identify a vNF in the vPLMN 115 that will facilitate the provision of a network service (in cooperation with a corresponding hNF in the hPLMN 110) to the UE 105 that has roamed into the coverage area of the vPLMN 115. The vNF discovery process involves vAMF 245-*v* sending a Nnrf Discovery message to the vNRF in the vPLMN, and the vNRF responding with a network address and/or FQDN, and vNF ID, of the vNF to which vAMF 245-*v* should send a service Request. FIG. 6 illustrates vAMF 245-*v* engaging in a vNF discovery process 600, involving a Nnrf discovery request, with vNRF 250-*v* in vPLMN 115, and sending a subsequent Request 605 to the discovered vNF 305-*v* using the network address/FQDN obtained during the discovery process 600.

In response to receipt of the Request from vAMF 245-*v*, vNF 305-*v* initiates and engages in hNF discovery with hNRF 250-*h* in hPLMN 110 to obtain a network address and/or FQDN of a hNF 305-*h* in the hPLMN 110 (block 510), and sends a Request to the hNF 305-*h* using the hNF 305-*h*'s obtained network address/FQDN (block 515). The hNF discovery process involves vNF 305-vsending a Nnrf Discovery message to the hNRF in the hPLMN 110, via vNRF 250-*v* acting as an intermediary, and the hNRF responding with the network address and/or FQDN, and hNF ID, of the hNF to which vNF 305-vshould send a service Request. FIG. 6 illustrates vNF 305-*v* engaging in a hNF discovery process 610, involving a Nnrf discovery request, with hNRF 250-*h* in hPLMN 110 (via vNRF 250-*v*), and sending a subsequent Request 615 to the discovered hNF 305-*h* using the network address/FQDN obtained during the discovery process 610.

hNF 305-*h* performs the requested service and generates service results upon receipt of the Request from the vNF 305-*v* (block 520). hNF 305-*h* further generates and sends a Response, that includes the service results, to the vNF 305-*v* (block 525). Various types of service Requests may be sent from the vNF to the hNF depending on the vNF's and the hNF's NF type. For example, if the vNF and the hNF are PCF NFs, then the vNF may send a UE Policy Association Create Request to the hNF which, in response, determines UE policy rules and policy-related information as service results. FIG. 6 shows hNF 305-*h*, upon receipt of Request 615, performing 620 the service requested in the Request 615, and sending a Response 625 to the requesting vNF 305-*v*. vNF 305-*v* receives the Response from the hNF 305-*h* and forwards the Response to the requesting vAMF 245-*v* (block 530). In an example in which the service Request included a UE Policy Association Create Request, then the vNF forwards the UE Policy Association Create Response, which may include policy-related information to the vAMF. FIG. 6 depicts vNF 305-*v* receiving the Response 625 from hNF 305-*h*, and forwarding the Response 625 to vAMF 245-*v* that originated the service request 605 for UE 105.

Figure 7:
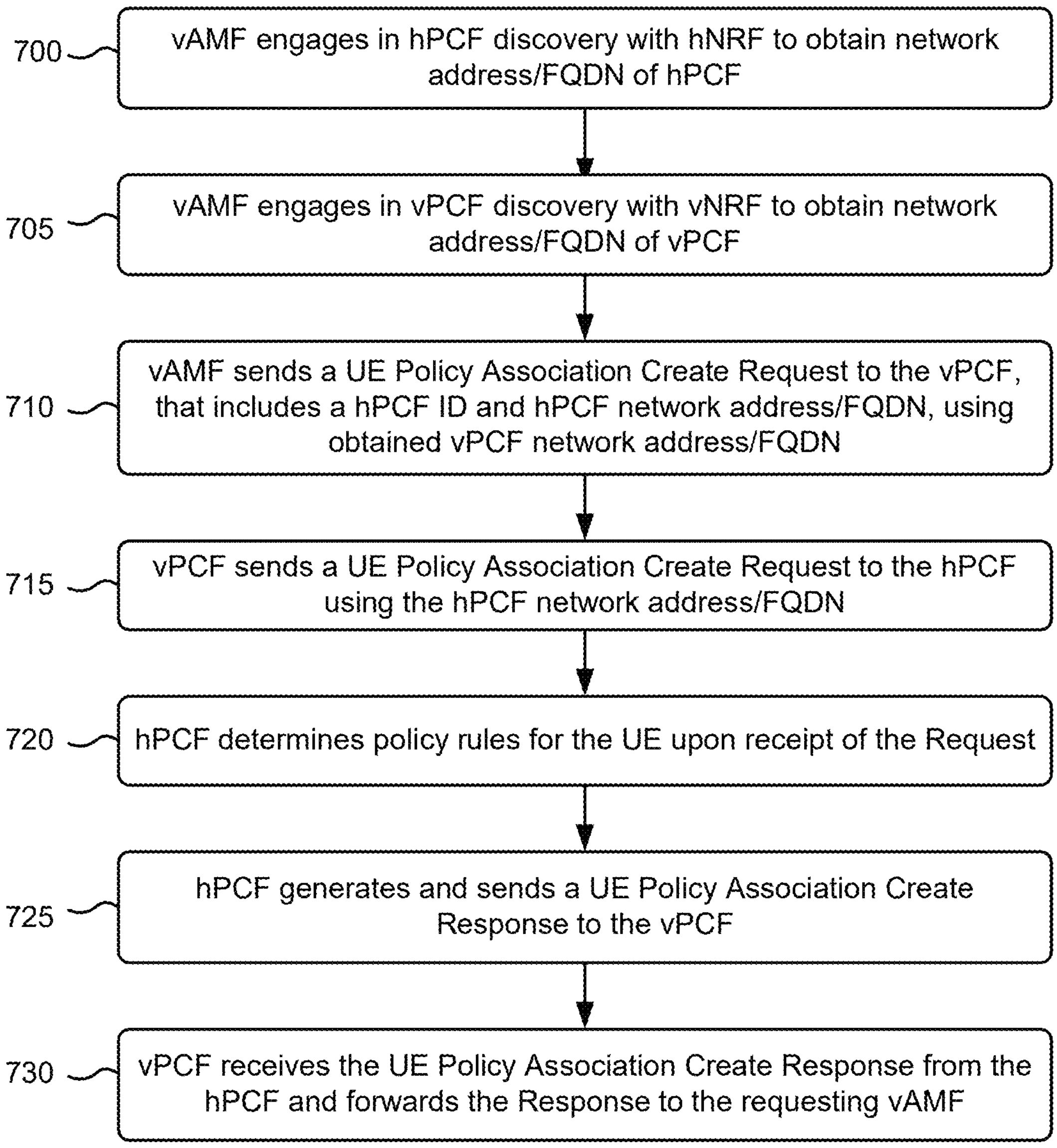
FIG. 7 is a flow diagram of an example process for discovery, by a visited Policy Control Function, of a home Policy Control Function in a hPLMN to which a UE is subscribed.

FIG. 7 is a flow diagram of an example process for discovery, of a hPCF in a hPLMN to which a UE 105 is subscribed, by a visited PCF, in which the vAMF initially shares the network address/FQDN of the hPCF with the vPCF. The example process of FIG. 7 may be implemented by a vAMF 245-*v* in conjunction with a vNRF 250-*v* and vPCF 255-*v* in a vPLMN 115, and a hNRF 250-*h* and hPCF 255-*h* in a hPLMN 110. The process of FIG. 7 is described with additional reference to the example diagram of FIG. 8. The example process of FIG. 7 may be executed subsequent to a UE 105 roaming from a coverage area of a hPLMN 110 to a coverage area of a vPLMN 115.

Figure 8:
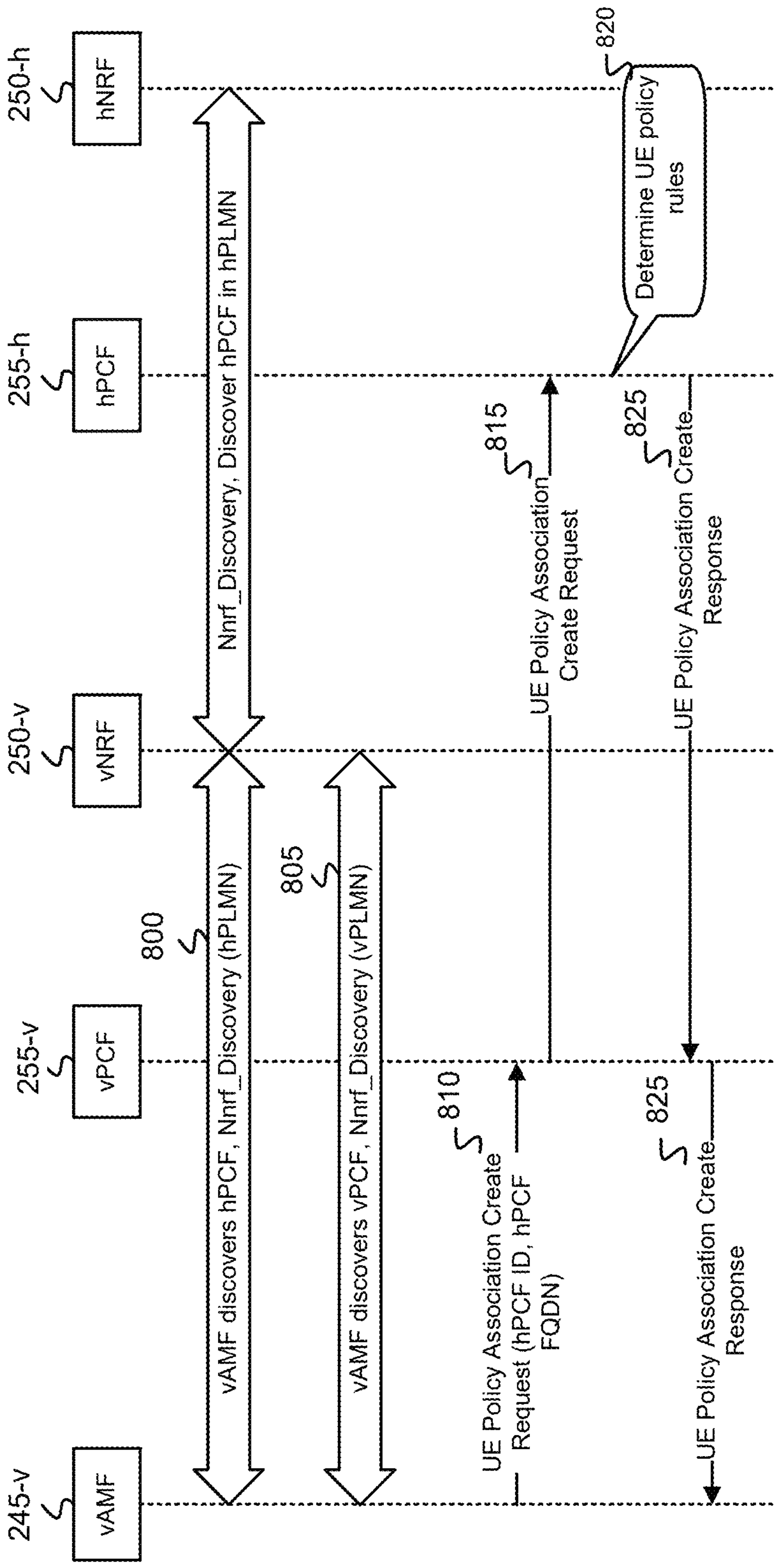
FIG. 8 is an example diagram associated with the process of FIG. 7.

The example process includes vAMF 245-*v* engaging in hPCF discovery with hNRF 250-*h* in hPLMN 110, via vNRF 250-*v* acting as an intermediary, to obtain a network address and/or a FQDN of a hPCF in hPLMN 110 (block 700), and engaging in vPCF discovery with vNRF 250-*v* in vPLMN 115 to obtain a network address and/or a FQDN of a vPCF 255-*v* in vPLMN 115 (block 705). The hPCF discovery process involves vAMF 245-*v* sending a Nnrf Discovery message to a vNRF 250-*v* in a vPLMN 115 which, in turn, sends/forwards the Nnrf discovery message to the hNRF 255-*h* in the hPLMN 110, and the hNRF 255-*h* responding with the network address and/or FQDN, and hPCF ID, of the hPCF to which vAMF 245-*v* should send a service Request in the hPLMN 110. Further, the vNF discovery process involves vAMF 245-*v* sending a Nnrf Discovery message to the vNRF in the vPLMN 115, and the vNRF responding with the network address and/or FQDN, and vPCF ID, of the vPCF to which vAMF 245-*v* should send a service Request in the vPLMN 115. FIG. 8 depicts vAMF 245-*v* engaging in a discovery process 800, to discover hPCF 255-*h* within hPLMN 110, with the UE 105's home network NRF, hNRF 250-*h*. FIG. 8 further shows vAMF 245-*v* engaging in a discovery process 805, to discover vPCF 255-*v* within vPLMN 115, with the visited network's NRF, vNRF 250-*v*.

vAMF 245-*v* sends a UE Policy Association Create Request to the vPCF 255-*v*, that includes a hPCF identifier (ID) and the network address/FQDN of the hPCF 255-*h*, using the obtained vPCF network address/FQDN (block 710). FIG. 8 illustrates vAMF 245-*v* sending a UE Policy Association Create Request message 810 to vPCF 255-*v*, where the Request 810 includes the hPCF ID and hPCF FQDN obtained during the hCF discovery process 800.

Upon receipt of the UE Policy Association Create Request from vAMF 245-*v*, vPCF 255-*v*, in turn, sends a UE Policy Association Create Request to the hPCF 255-*h* using the hPCF 255-*h*'s network address/FQDN (block 715). vPCF 255-*v* extracts the network address/FQDN from the Request received from the vAMF, and generates a corresponding UE Policy Association Create Request having its destination being the network address or FQDN of the hPCF. FIG. 8 depicts vPCF 255-*v* sending a UE Policy Association Create Request 815 to hPCF 255-*h*.

hPCF 255-*h* determines policy rules for the UE 105 upon receipt of the Request (block 720), and generates and sends a UE Policy Association Create Response to the vPCF 255-*v* (block 725). hPCF 255-*h* determines the UE policy rules using existing procedures. The determined UE policy rules may be sent to the UE 105 (i.e., directly or indirectly) in another message subsequent to the UE Policy Association Create Response, such as a UE Route Selection Policy (URSP) message. The example of FIG. 8 shows hPCF 255-*h* determining 820 UE policy rules for the UE 105, and sending a UE Policy Association Create Response 825 to vPCF 255-*v*. vPCF 255-*v* receives the UE Policy Association Create Response from the hPCF 255-*h* and forwards the Response to the requesting vAMF 245-*v* (block 730). The example of FIG. 8 depicts vPCF 255-*v* forwarding the UE Policy Association Create Response 825, to vAMF 245-*v*.

Figure 9:
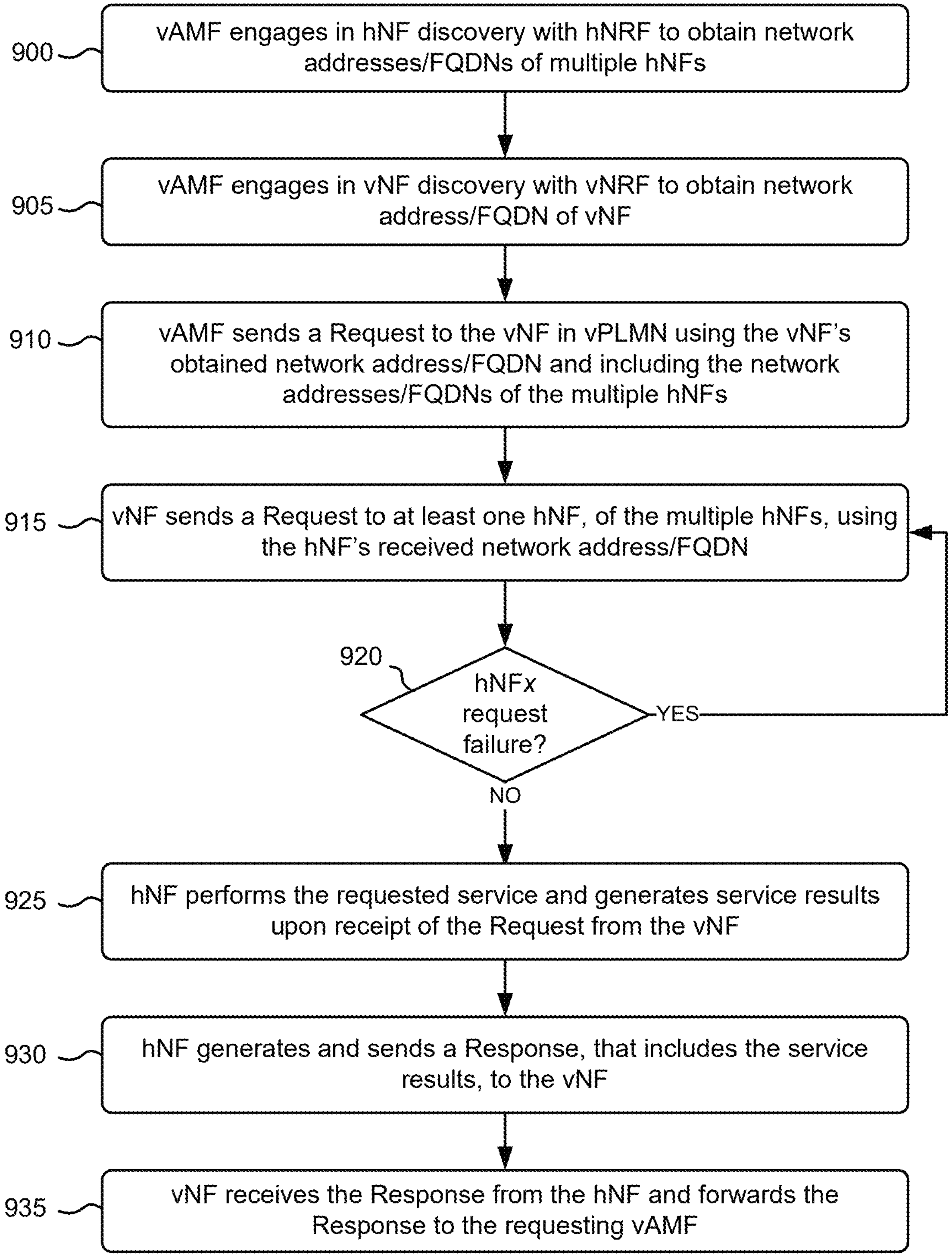
FIG. 9 is a flow diagram of an example process for hNF discovery in which multiple hNFs of a hPLMN may be shared with a vNF in a vPLMN for use in performing a network service involving at least one of the multiple home network functions.

FIG. 9 is a flow diagram of an example process for home NF discovery in which multiple hNFs of the hPLMN 110 may be shared with a vNF in a visited PLMN 115 for use in performing a network service involving at least one of the multiple hNFs. The example process of FIG. 9 may be implemented by a vAMF 245-*v* in conjunction with a hNRF 250-*h*, a vNRF 250-*v*, a vNF 305-*v*, and one or more of hNFs 305-1-h through 305-*y*-*h* in a hPLMN 110. The process of FIG. 9 is described with additional reference to the example diagram of FIG. 10. The example process of FIG. 9 may be executed subsequent to a UE 105 roaming from a coverage area of hPLMN 110 to a coverage area of a vPLMN 115.

Figure 10:
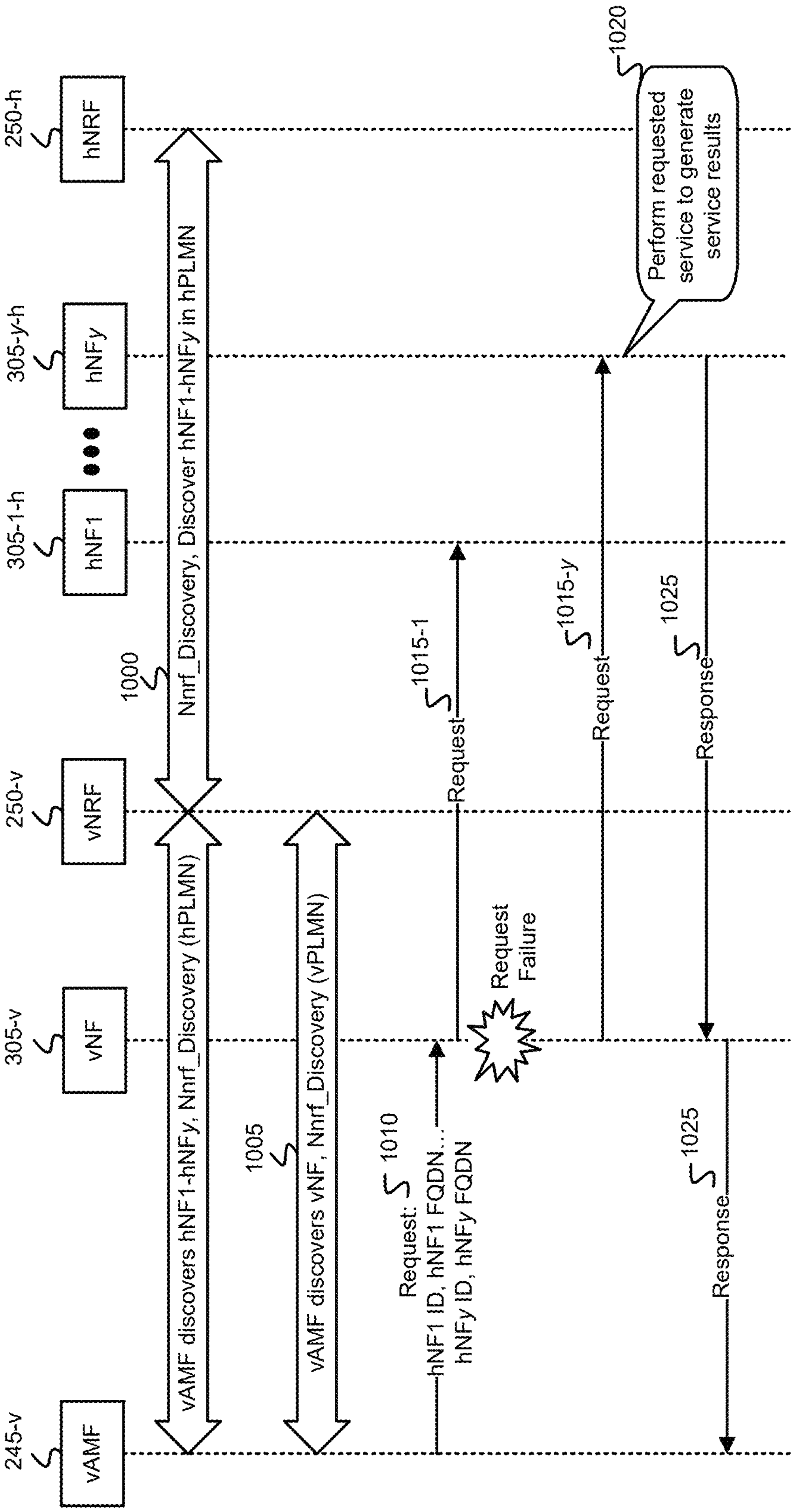
FIG. 10 is an example diagram associated with the process of FIG. 9.

Referring to FIG. 9, the example process includes vAMF 245-*v* engaging in hNF discovery with hNRF 250-*h* to obtain network addresses and/or FQDNs of multiple hNFs 305-*h* in hPLMN 110 (block 900). The hNF discovery process involves vAMF 245-*v* sending a Nnrf Discovery message to the hNRF in the hPLMN 110, and the hNRF responding with the network addresses and/or FQDNs, and hNF IDs, of multiple hNFs 305-*h* in hPLMN 110 that may be involved in servicing a service request for the UE 105 and/or a particular UE session. FIG. 10 depicts an example in which vAMF 245-*v* engages in hNF discovery 1000, involving a Nnrf discovery request, with hNRF 250-*h* to discover the network addresses and/or FQDNs of multiple hNFs (e.g., hNF1-hNFy) in hPLMN 110.

The example process further includes vAMF 245-*v* engaging in vNF discovery with vNRF 250-*v* to obtain a network address and/or FQDN of a vNF 305-*v* (block 905), and sending a Request to the vNF 305-*v* in the vPLMN 115 using the vNF 305-*v*'s obtained network address/FQDN (block 910). The Request sent from vAMF 245-*v* to vNF 305-*v* may include the network addresses and/or FQDNs of the multiple hNFs 305-1-h through 305-*y*-*h* discovered in block 900. The vAMF 245-*v* engages in vNF discovery to identify a vNF in the vPLMN 115 that will facilitate the provision of a network service (in cooperation with one or more hNFs in the hPLMN 110) to the UE 105 that has roamed into the coverage area of the vPLMN 115. The vNF discovery process involves vAMF 245-*v* sending a Nnrf Discovery message to the vNRF in the vPLMN 115, and the vNRF responding with a network address and/or FQDN, and vNF ID, of the vNF to which vAMF 245-*v* should send a service Request. FIG. 10 illustrates vAMF 245-*v* engaging in a vNF discovery process 1005, involving a Nnrf discovery request, with vNRF 250-*v* in vPLMN 115, and sending a subsequent Request 1010 to the discovered vNF 305-*v* using the network address/FQDN obtained during the discovery process 1005. The Request 1010 further includes the hNF IDs and/or FQDNs of the multiple hNFs (hNF1-hNFy) discovered by vAMF 245-*v* in block 900.

In response to receipt of the Request from vAMF 245-*v*, vNF 305-*v* sends a service Request to at least one of the hNFs, of the multiple hNFs (hNF1-hNFy), using the network address(es)/FQDN(s) received from vAMF 245-*v* (block 915), and vNF 305-*v* determines whether a service request failure subsequently occurs (block 920). If there is a service request failure (YES-block 920), then block 915 repeats, with the vNF 305-*v* sending another Request to a different one of the multiple hNFs discovered in block 900. If there is no service request failure (NO-block 925), then the process continues at block 925 below. In one implementation, vNF 305-*v* may select (e.g., randomly, or based on an hNF network performance measure, such as latency) one of the hNFs, from the multiple hNFs (hNF1-hNFy). In another implementation, the request received from vAMF 245-*v* may include a list of hNF IDs and/or FQDNs of the multiple hNFs that may be prioritized to indicate an order in which to send a service request(s) to each of the multiple hNFs. A service request failure may occur when no response is received from the hNF within a particular period of time, or when the hNF returns an error message. FIG. 10 illustrates vNF 305-*v* sending a first Request 1015-1 to a first hNF 305-1-h using a network address/FQDN for the first hNF 305-1-h received from vAMF 245-*v*. In the example of FIG. 10, either no response is received from the hNF 305-1-h, or hNF 305-1-h returns an error message (not shown), and vNF 305-*v* subsequently sends another Request 1015-*y* to hNFy 305-*y*-*h*. vNF 305-*v* may repeat the sending of Requests 1015 y times to request service from each of the y multiple hNFs contained in the original Request 1010 received from the vAMF 245-*v*.

hNF 305-*h* performs the requested service and generates service results upon receipt of the Request from the vNF 305-*v* (block 925). hNF 305-*h* further generates and sends a Response, that includes the service results, to the vNF 305-*v* (block 930). Various types of service Requests may be sent from the vNF to the hNF depending on the vNF's and the hNF's NF type. For example, if the vNF and the hNF are PCF NFs, then the vNF may send a UE Policy Association Create Request to the hNF which determines UE policy rules as service results. FIG. 10 shows hNF 305-*y*-*h*, upon receipt of Request 1015-*y*, performing 1020 the service requested in the Request 1015-*y*, and sending a Response 1025 to the requesting vNF 305-*v*.

vNF 305-*v* receives the Response from the hNF 305-*h* and forwards the Response to the requesting vAMF 245-*v* (block 935). In an example in which the service Request included a UE Policy Association Create Request, then the vNF 305-*v* forwards the UE Policy Association Create Response, that includes the service results, to the vAMF 245-*v*. FIG. 10 depicts vNF 305-*v* receiving the Response 1025 from hNF 305-*y*-*h*, and forwarding the Response 1025 to vAMF 245-*v* that originated the service request 1010 for UE 105.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 5, 7, and 9, and sequences of operations, messages, and/or data flows with respect to FIGS. 6, 8, and 10, the order of the blocks and/or the operations, messages, and/or data flows may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processing unit 320) of a device. A non-transitory storage medium includes one or more of the storage mediums described in relation to memory 330. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

All structural and functional equivalents to the elements of the various aspects set forth in this disclosure that are known or later come to be known to those of ordinary skill in the art are expressly incorporated herein by reference and are intended to be encompassed by the claims.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

receiving, by a mobility management function residing in a visited Public Land Mobile Network (vPLMN) from a first Network Repository Function (NRF) residing in a home Public Land Mobile Network (hPLMN), at least one of a first network address or a first fully qualified domain name (FQDN) of a first home network function (hNF) residing in the hPLMN;

creating, by the mobility management function, a network service request, associated with a User Equipment device (UE) that is roaming in the vPLMN, wherein the network service request comprises the at least one of the first network address or the first FQDN;

sending, by the mobility management function, the network service request to a visited network function (vNF) residing in the vPLMN such that the vNF requests, using the at least one of the first network address or the first FQDN, execution of a first network service from the first hNF;

receiving, by the mobility management function from the vNF, first results of execution of the requested first network service by the first hNF; and using, by the mobility management function, the first results for handling the roaming UE's traffic in the vPLMN.

2. The method of claim 1, further comprising:

receiving, by the mobility management function from the first NRF residing in the hPLMN, at least one of a second network address or a second FQDN of a second hNF residing in the hPLMN, wherein the network service request further comprises the at least one of the second network address or the second FQDN of the second hNF.

3. The method of claim 2, further comprising:

engaging, by the mobility management function, in a discovery process involving the first NRF residing in the hPLMN to discover the at least one of the second network address or the second FQDN of the second hNF residing in the hPLMN.

4. The method of claim 1, wherein the hNF comprises a home Policy Control Function (hPCF) residing in the hPLMN, wherein the vNF comprises a visited Policy Control Function (vPCF) residing in the vPLMN, and wherein the network service request comprises a UE Policy Association Create Request.

5. The method of claim 4, wherein the results of the execution of the requested network service comprise policy-related information for the UE.

6. The method of claim 1, wherein the vPLMN comprises a Next Generation mobile network and wherein the mobility management function comprises an Access and Mobility Management Function (AMF).

7. The method of claim 1, further comprising:

engaging, by the mobility management function, in a discovery process involving the first NRF residing in the hPLMN to discover the at least one of the first network address or the first FQDN of the first hNF residing in the hPLMN.

8. A network device residing in a visited Public Land Mobile Network (vPLMN), comprising:

at least one communication interface configured to communicate via the vPLMN and to receive, from a first Network Repository Function (NRF) residing in a home Public Land Mobile Network (hPLMN), at least one of a first network address or a first fully qualified domain name (FQDN) of a first home network function (hNF) residing in the hPLMN; and at least one processor configured to execute a mobility management function to:

create a network service request, associated with a User Equipment device (UE) that is roaming in the vPLMN, wherein the network service request comprises the at least one of the first network address or the first FQDN;

send, via the at least one communication interface, the network service request to a visited network function (vNF) residing in the vPLMN such that the vNF requests, using the at least one of the first network address or the first FQDN, execution of a first network service from the first hNF;

receive, from the vNF via the at least one communication interface, first results of execution of the requested first network service by the first hNF; and use the first results for handling the roaming UE's traffic in the vPLMN.

9. The network device of claim 8, wherein the at least one communication interface is further configured to receive, from the firstNRF residing in the hPLMN, at least one of a second network address or a second FQDN of a second hNF residing in the hPLMN, wherein the network service request further comprises the at least one of the second network address or the second FQDN of the second hNF.

10. The network device of claim 9, wherein the at least one processor is further configured to execute the mobility management function to:

engage, via the at least one communication interface, in a discovery process involving the first NRF residing in the hPLMN to discover the at least one of the second network address or the second FQDN of the second hNF.

11. The network device of claim 8, wherein the hNF comprises a home Policy Control Function (hPCF) residing in the hPLMN, wherein the vNF comprises a visited Policy Control Function (vPCF) residing in the vPLMN, and wherein the network service request comprises a UE Policy Association Create Request.

12. The network device of claim 11, wherein the results of the execution of the requested network service comprise policy-related information for the UE.

13. The network device of claim 8, wherein the vPLMN comprises a Next Generation mobile network and wherein the mobility management function comprises an Access and Mobility Management Function (AMF).

14. The network device of claim 8, wherein the at least one processor is further configured to execute the mobility management function to:

engage in a discovery process involving the first NRF residing in the hPLMN to discover the at least one of the first network address or the first FQDN of the first hNF residing in the hPLMN.

15. A non-transitory storage medium storing instructions executable by a network device residing in a visited Public Land Mobile Network (vPLMN), wherein execution of the instructions causes the network device to implement a mobility management function to:

receive, from a first Network Repository Function (NRF) residing in a home Public Land Mobile Network (hPLMN), at least one of a first network address or a first fully qualified domain name (FQDN) of a first home network function (hNF) residing in the hPLMN;

create a network service request, associated with a User Equipment device (UE) that is roaming in the vPLMN, wherein the network service request comprises the at least one of the first network address or the first FQDN;

send the network service request to a visited network function (vNF) residing in the vPLMN such that the vNF requests, using the at least one of the first network address or the first FQDN, execution of a first network service from the first hNF;

receive, from the vNF, first results of execution of the requested first network service by the first hNF; and use the first results for handling the roaming UE's traffic in the vPLMN.

16. The non-transitory storage medium of claim 15, wherein execution of the instructions further causes the mobility management function to:

receive, from the firstNRF residing in the hPLMN, at least one of a second network address or a second FQDN of a second hNF residing in the second hPLMN, wherein the network service request further comprises the at least one of the second network address or the second FQDN of the second hNF.

17. The non-transitory storage medium of claim 16, wherein the hNF comprises a home Policy Control Function (hPCF) residing in the hPLMN, wherein the vNF comprises a visited Policy Control Function (vPCF) residing in the vPLMN, and wherein the network service request comprises a UE Policy Association Create Request.

18. The non-transitory storage medium of claim 17, wherein the results of the execution of the requested network service comprise policy-related information for the UE.

19. The non-transitory storage medium of claim 15, wherein the vPLMN comprises a Next Generation mobile network and wherein the mobility management function comprises an Access and Mobility Management Function (AMF).

20. The non-transitory storage medium of claim 15, wherein execution of the instructions further causes the mobility management function to:

engage in a discovery process involving the first NRF residing in the hPLMN to discover the at least one of the first network address or the first FQDN of the first hNF residing in the hPLMN.

* * * * *